(12) United States Patent
Peng

(10) Patent No.: US 8,386,232 B2
(45) Date of Patent: Feb. 26, 2013

(54) PREDICTING RESULTS FOR INPUT DATA BASED ON A MODEL GENERATED FROM CLUSTERS

(75) Inventor: Fuchun Peng, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1131 days.

(21) Appl. No.: 11/445,587

(22) Filed: Jun. 1, 2006

(65) Prior Publication Data

US 2007/0282591 A1    Dec. 6, 2007

(51) Int. Cl.
   *G06F 17/28*   (2006.01)
(52) U.S. Cl. ............ 704/3; 382/170; 382/225; 600/513; 702/19; 702/66; 704/256; 704/260; 704/9; 706/19; 706/20; 715/203
(58) Field of Classification Search .............. 704/9, 256, 704/260; 707/999.001; 382/170, 225; 600/513; 702/19, 66; 706/19, 20; 715/203
   See application file for complete search history.

(56) References Cited

U.S. PATENT DOCUMENTS

| | | | | |
|---|---|---|---|---|
| 5,537,488 | A * | 7/1996 | Menon et al. ................. | 382/170 |
| 5,835,901 | A * | 11/1998 | Duvoisin et al. ................ | 706/19 |
| 6,052,657 | A * | 4/2000 | Yamron et al. .................... | 704/9 |
| 6,311,152 | B1 * | 10/2001 | Bai et al. ........................... | 704/9 |
| 6,317,708 | B1 * | 11/2001 | Witbrock et al. ................. | 704/9 |
| 6,675,159 | B1 * | 1/2004 | Lin et al. ............... | 1/1 |
| 6,697,769 | B1 | 2/2004 | Goodman et al. | |
| 6,772,120 | B1 * | 8/2004 | Moreno et al. ................ | 704/256 |
| 6,848,080 | B1 * | 1/2005 | Lee et al. ....................... | 715/203 |
| 7,039,239 | B2 * | 5/2006 | Loui et al. ..................... | 382/225 |
| 7,400,981 | B1 * | 7/2008 | Rigney ............................ | 702/19 |
| 7,706,992 | B2 * | 4/2010 | Ricci et al. ...................... | 702/66 |
| 2002/0083025 | A1 | 6/2002 | Robarts et al. | |
| 2002/0194158 | A1 | 12/2002 | Stensmo | |
| 2003/0023420 | A1 | 1/2003 | Goodman | |
| 2005/0171948 | A1 * | 8/2005 | Knight .............................. | 707/6 |
| 2005/0234955 | A1 * | 10/2005 | Zeng et al. .................... | 707/101 |
| 2006/0069566 | A1 * | 3/2006 | Fukada et al. ................ | 704/260 |
| 2006/0089924 | A1 * | 4/2006 | Raskutti et al. ................... | 707/1 |
| 2006/0200035 | A1 * | 9/2006 | Ricci et al. .................... | 600/513 |
| 2006/0287848 | A1 * | 12/2006 | Li et al. .............. | 704/9 |
| 2007/0233625 | A1 * | 10/2007 | Tian et al. ....................... | 706/20 |

OTHER PUBLICATIONS

Chinese Office Action received in corresponding Application No. 200780020357.4 dated Mar. 26, 2010 (6 pages).
Current Claims in corresponding Application No. 200780020357.4 date Mar. 2010 (2 pages).

(Continued)

*Primary Examiner* — Michael Colucci
(74) *Attorney, Agent, or Firm* — Hickman Palermo Truong Becker Bingham Wong LLP

(57) ABSTRACT

A method for predicting results for input data based on a model that is generated based on clusters of related characters, clusters of related segments, and training data. The method comprises receiving a data set that includes a plurality of words in a particular language. In the particular language, words are formed by characters. Clusters of related characters are formed from the data set. A model is generated based at least on the clusters of related characters and training data. The model may also be based on the clusters of related segments. The training data includes a plurality of entries, wherein each entry includes a character and a designated result for said character. A set of input data that includes characters that have not been associated with designated results is received. The model is applied to the input data to determine predicted results for characters within the input data.

32 Claims, 4 Drawing Sheets

OTHER PUBLICATIONS

Notification of Transmittal of the International Search Report and the Written Opinion of the International Searching Authority, or the Declaration as received in corresponding International application No. PCT/US2007/012762 dated Nov. 7, 2007.

European Search Report received in corresponding Application No. 07795498.0 dated Dec. 9, 2010 (9 pages).

Current Claims in corresponding European Application No. 07795498.0, Dec. 2010 (4 pages).

D1: Kashioka, H. et al., "Use of Mutual Information Based Character Clusters in Dictionary-less Morphological Analysis of Japanese" Proceedings of the 17$^{th}$ International Conference on Computational Linguistics, vol. 1, 1998, XP-00260334 (6 pages).

D2: Zhou, X. et al., "Distributional Character Clustering for Chinese Text Categorization," PRICAI 2004: Trends in Artificial Intelligence, Springer-Verlag, 2004, XP002606330 (10 pages).

D3: Peng, F. et al., "A Hierarchical EM Approach to Word Segmentation," Proceedings of the Sixth Natural Language Processing Pacific Rim Symposium, Nov. 30, 2001, XP002606331 (6 pages).

D4: Gao, J. et al., "The Use of Clustering Techniques for Language Modeling—Application to Asian Languages" Computational Linguistics and Chinese Language Processing, 2001, XP002606332 (6 pages).

Scott Miller et al., "Name Tagging with Word Clusters and Discriminative Training", pp. 337-342, 2004.

Fuchun Peng et al., "Chinese Segmentation and New Word Detection using Conditional Random Fields", 7 pages, 2004.

Fernando Pereira et al., "Distributional Clustering of English Words", Proceedings of ACL '93, pp. 183-190, 1993.

Korean Intellectual Property Office, "Notification of Transmittal of the International Search Report and the Written Opinion of the International Searching Authority, or The Declaration", International application No. PCT/US2007/012762, Received Nov. 13, 2007, 9 pages.

Claims, International application No. PCT/US2007/012762, 5 pages, Nov. 13, 2007.

* cited by examiner

PREDICTING RESULTS FOR INPUT DATA BASED ON A MODEL GENERATED FROM CLUSTERS

FIELD OF THE INVENTION

The present invention relates to machine learning tools. In particular, the present invention relates to using segment and character clustering to limit the amount of training data needed for a machine learning tool to generate an accurate model.

BACKGROUND

Machine learning tools (MLT) can be used to identify or predict patterns. For example, an MLT can learn to predict that a particular word in written text is a person's name or a location name. As another example, an MLT can learn to predict the location of a particular record in a given set of data. More particularly, the MLT might learn to predict the location of a company name record in a job listing. Machine learning tools can learn to predict many other types of patterns.

Training data is often used to provide patterns from which the MLT learns to predict the existence of patterns in other data ("input data"). The patterns in the training data may comprise "inputs" that are mapped to "designated results." An input may be any element in the training data. A designated result may be a label associated with the input. Typically, a human provides the designated results. For example, a human labels words ("inputs") in the training data to indicate that a particular word is a "named entity" such as a person's name, location name, or same other named entity. Based on the inputs and designated results, the MLT develops a model that can be applied to predict results for input data that has no designated results. As a particular example, the MLT learns to extract named entities from input data. As another example, the MLT learns to determine or predict where a particular type of record, such as a company name field, is located in the input data.

Because the training data provides patterns to teach the MLT, the accuracy of the model generated by the MLT is affected by the nature of the training data. If the training data includes more patterns or better patterns, the MLT is able to generate a more accurate model. Because the training data is typically manually generated, creating training data can be costly. Moreover, there is a often a problem obtaining enough training data for the MLT to generate an accurate model. In particular, for many languages there is a lack of adeqaute training data. As a specific example, there is a lack of adequate training data for the Chinese langauge. However, the problem of providing a suffcient amount and quality of training data for the MLT applies to all languages.

Thus, there is a need for generating accurate models using an MLT based on a limited amount of training data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed for predicting results for input data. The predicted results are predicted based on a model. The model is generated by an MLT based on training data. However, in addition to the training data, the model also takes into account features that correspond to (1) related-character clusters and/or (2) related-segment clusters. By taking into account features that correspond to related-character clusters and/or related-segment clusters, the MLT is able to produce a better model using the same training data. Producing a better model ultimately results in more accurate predicted results. Related-character clusters, related-segment clusters, and how they may be used to generate a model, shall be described in greater detail hereafter.

Architectural Overview

Figure 1:
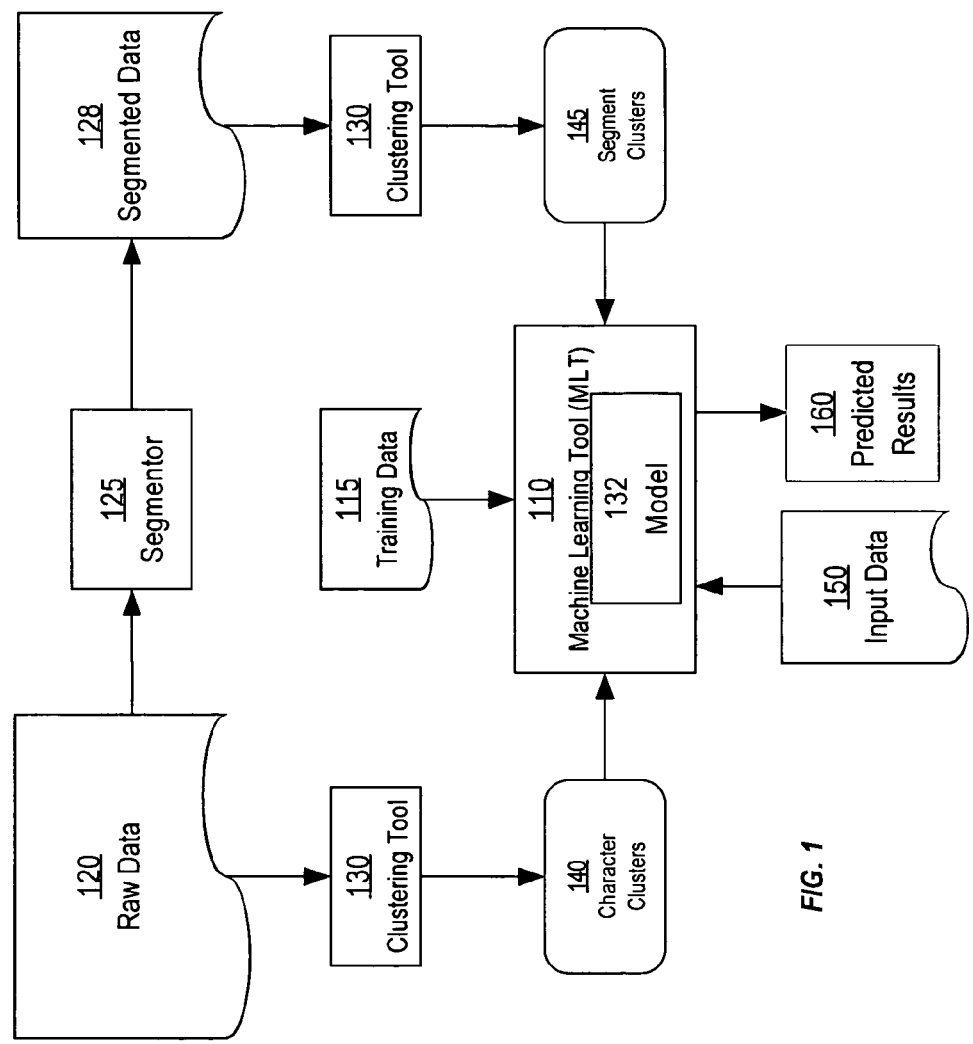
FIG. 1 is an architectural overview of using segment clusters and character clusters to augment training data from which an MLT generates a model to predict results, in accordance with an embodiment of the present invention.

FIG. 1 is an architectural overview of using segment clusters and character clusters to augment training data for an MLT to generate a model that is used to predict results, in accordance with an embodiment of the present invention. The training data 115, the character clusters 140, and the segment clusters 145 are input into the MLT 110, which learns from these inputs to determine a model 132. The model 132 is used to predict results for the input data 150.

Training Data

The training data 115 contains patterns from which the MLT 110 learns in order to generate the model 132. The training data 115 contains training items and a designated result for the training items, in one embodiment. For example, the training items may be Chinese characters, and the designated results may specify classifications for the characters. For example, the training data may indicate that one Chinese character is the name of a place. The training data may indicate that another Chinese character is the name of a person. The training data may indicate that yet another Chinese character is not any type of named entity.

In one embodiment, the designated result for a character may indicate whether the character is at least a portion of a person's name or a location name. The designated result for a character may also indicate that the character is the beginning of a named entity. The designated result for other characters in that named entity may indicate that the other characters are a part of the named entity other than the beginning.

The training data 115 contains text in a language for which boundaries between words are not readily discernable, in one embodiment. For example, the training data 115 may be Chinese text. In Chinese text, the spacing between characters that belong to the same word is the same as the spacing between characters that belong to different words. When the boundary between related characters is not readily discernable, the training data 115 is referred to as un-segmented data. Chinese text is merely one example of a situation in which the training data 115 contains text for which word boundaries are not explicitly defined. In this example, a character may be labeled with a designated result that indicates whether the character is the beginning of a word or not.

The MLT 110 is capable of generating the model 132 based on the training data 115 alone. However, as shall be described in greater detail hereafter, the segment clusters 145 and/or the character clusters 140 are used to improve the accuracy of the model 132, without requiring an increase in the size of the training data 115.

Raw Data

In one embodiment, the segment clusters 145 and the character clusters 140 are generated, directly or indirectly, from the raw data 120. Unlike the training data 115, the raw data 120 does not include designated results. In other words, there is no need for a human to place labels in the raw data 120. Therefore, the raw data 120 may be collected from any convenient source. Moreover, the raw data 120 can be a very large corpus because no manual labeling is required.

The raw data 120 may be un-segmented data. For example, the boundary between related characters in the raw data 120 is not readily discernable, in one embodiment. As one example, the raw data 120 may be Chinese text. More generally, un-segmented raw data 120 may be any text for which word boundaries are not explicitly defined. Raw data 120 that is segmented can also be used. For example, the boundary between related characters in the raw data 120 is readily discernable, in one embodiment.

Related-Segment Clusters

In situations where the raw data 120 is un-segmented data, a segmentor 125 is used to segment the raw data 120 to divide the raw data 120 into segments. The segments are collectively shown as segmented data 128. In general, a segment is a string of one or more characters that are related in some manner. The segments may correspond to words, but that is not required.

The segment clusters 145 are formed from the segmented data 128 by the clustering tool 120. A segment cluster 145 comprises two or more related segments. For example, the clustering tool 120 analyzes the segmented data 128 to determine segments that may be contextually related to one another in the segmented data 128. If the segments are words, then a segment cluster 145 is a group of words that are related to each other given how they appear in the segmented data 128. Segment clusters 145 are generated using a distributional word clustering technique, in one embodiment.

Segment clusters may be generated either by what is commonly referred to as "hard clustering" or by "soft clustering". In hard clustering, each particular segment is assigned to one cluster. In soft clustering, a particular segment may be assigned to many different clusters. Furthermore, with soft clustering, probabilities may be assigned to segments, as follows. If a particular segment is assigned to "n" different clusters, then a probability is assigned to the segment in each of the n clusters. The clustering is based on distributional word clustering, in one embodiment.

Related Character Clusters

The character clusters 140 are formed from the raw data 120 by the clustering tool 120. Each character cluster includes a set of related characters. In one embodiment, character clusters 140 are generated using the clustering tool 120. Clustering tool 120 may generate the character clusters 140 using a distributional word clustering technique by treating individual characters in the raw data 120 as distinct words.

Similar to segment clusters, character clusters may be generated by "hard clustering" or by "soft clustering". In hard clustering, each particular character is assigned to one cluster. In soft clustering, a particular character may be assigned to many different clusters. Similar to segment clusters, with soft clustering of characters, probabilities may be assigned to the characters.

Applying Features to the Training Data Base on Clusters

The MLT 110 "applies features" to the training data 115 based on the character clusters 140 and/or segment clusters 145, in one embodiment. Specifically, for each of the training items in the training data, the MLT 110 determines which of the character clusters and/or segment clusters the training item matches with. The clusters with which a training item matches is considered a "feature" of the training item. A training item may match with many clusters, and therefore have many features. The MLT 110 may apply features to the training data based on other factors, as well.

The model 132 is based on the features. For example, the MLT 110 analyzes the features and designated results to determine the model 132. The MLT 110 uses "conditional random fields" to generate the model 132, in one embodiment. Conditional random fields are described in "Conditional random fields: Probabilistic models for segmenting and labeling sequence data" (Lafferty, J., McCallum, A., Pereira, F.). In: Proc. 18th International Conf. on Machine Learning, Morgan Kaufmann, San Francisco, Calif. (2001) 282-289. The MLT 110 use "maximum entropy modeling", in one embodiment. Maximum entropy modeling is described in "A Maximum Entropy Approach to Natural Language Processing", (Adam Berger, Stephen Della Pietra, Vincent Della Pietra), Computational Linguistics, 22 (1). In one embodiment, the MLT 110 is a support vector machine. Support vector machines are described in "Text Categorization with Support Vector Machines: Learning with Many Relevant Features", (T. Joachims). Proceedings of the European Conference on Machine Learning, Springer, 1998.

Applying Features to the Input Data Based on Clusters

The input data 150 is data that is to be processed by the MLT 110, based on the model 132 and features that the MLT 110 applies to the input data 150. The input data 150 contains input items. The MLT 110 applies features to the input items based on the character clusters 140 and/or segment clusters 145.

In one embodiment, the input data 150 is un-segmented data. For example, the input data 150 might be Chinese text. An input item may be a single Chinese character. In one embodiment, the MLT 110 determines which of the character clusters and/or segment clusters the input items match with. The clusters with which an input item matches is considered a "feature" of the input item. An input item may match with many clusters, and therefore have many features.

In one embodiment, prior to applying features to input items in un-segmented data, the MLT 110 may parse the input data to generate parsed input items. For example, the input data 150 might be Chinese text. In this embodiment, the MLT 110 segments the input data 150 into words. For each of the parsed input items, the MLT 110 determines which of the character clusters and/or segment clusters the parsed input items match with. The clusters with which a parsed input item matches is considered a "feature" of the parsed input item. A parsed input item may match with many clusters, and therefore have many features.

Predicting Results for the Input Data

The MLT 110 applies the model 132 to the features to determine predicted results 160 for the parsed input items from the input data 150. The predicated results 160 are predictions of what results would have been designated for the parsed input items in the input data 150. In general, the more features that a parsed input item has in common with a training item, the more likely the parsed input item should be assigned the result that was designated for that training item.

In a simple case, a parsed input item will be identical to a training set item, and therefore the MLT 110 will assign to the parsed input item a predicted result that is the same as the designated result of the training set item. In more difficult cases, an input item may not match any training set item. In these cases, the MLT 110 may assign the parsed input item a predicted result that is the same as the designated result of the training set item that has the most features in common with the parsed input item.

Typically, the predicted results will classify the parsed input items using the same classifications that were used as the "designated results" to manually classify the training set items. For example, if the designated results indicated which training set items were "named entities", then the predicted results 160 may indicate which of the parsed input items are likely to be "named entities".

Examples of Applying Features to Training Items and Input Items and Predicting Results Based on the Features A) Based on Character Clusters The following example is provided to explain how features might be assigned to training items in the training data 115 and the input data 150 and used to predict results for the input data 150, based on character clusters. For this example, character cluster one comprises the characters "X", "A" and "Q"; character cluster two comprises the characters "Y", "F" and "L". The training data 115 has the training items "X", "Y" and "Z". The input data 150 has the input items "A", "F" and "B". The training item "X" in the training data has a designated result of "beginning of named entity". The training item "Y" in the training data has a designated result of "named entity other than beginning". The training item "Z" in the training data does not have a designated result in this example.

The MLT 110 applies to training item "X" in the training data 115 a feature "character cluster one" and to training item "Y" in the training data 115 a feature "character cluster two". Training item "Z" in the training data 115 is not assigned a feature based on the example character clusters.

The MLT 110 applies to input item "A" in the input data 150 is assigned a feature "character cluster one" and to input item "F" in the input data 150 a feature "character cluster two". Input item "B" in the input data 150 is not assigned a feature based on the example character clusters.

Based on the assigned feature of "character cluster one", the MLT 110 predicts for input item "A" a result of "beginning of named entity". That is, in this example, the MLT 110 predicts that input item "A" should have the same result as training item "X" in the training data. Based on the assigned feature of "character cluster two", the MLT 110 predicts for input item "F" a result of "named entity other than beginning". That is, in this example, the MLT 110 predicts that input item "F" should have the same result as training item "Y" in the training data. The MLT 110 predicts that input item "B" is not part of a named entity. Based on these predictions, the MLT 110 predicts that the combination of input items "A" and "F" are a named entity.

B) Based on Segment Clusters

The following example is provided to explain how features might be assigned to training items in the training data 115 and the input data 150 and used to predict results for the input data 150, based on segment clusters. For this example, segment cluster one comprises the segment "AB", along with other segments; and segment cluster two comprises the characters "ABCD" along with other segments. The training data 115 has the sequence of training items "ABCDEF".

The MLT 110 determine a feature to apply to training item "A" in the training data, as follows. The MLT 110 examines strings of training items starting at "A" and determines if any of the segment clusters has a segment match for any of the strings of training items. If multiple segment matches are found, training item "A" is assigned a feature associated with the longest segment. Thus, the MLT 110 determines that segment "AB" is in segment cluster one and that that segment "ABCD" is in segment cluster two. The MLT 110 applies a feature of "segment cluster two" to training item "A" because this is the longest segment.

Next, the MLT 110 applies a feature, based on the segment clusters, to "B" in the training data 115. The MLT 110 also applies features to input items in the input data 150, based on the segment clusters. Further, the MLT 110 predicts results for input items in the input data 150, based on the features that were assigned based on the segment clusters.

General Process

Figure 2:
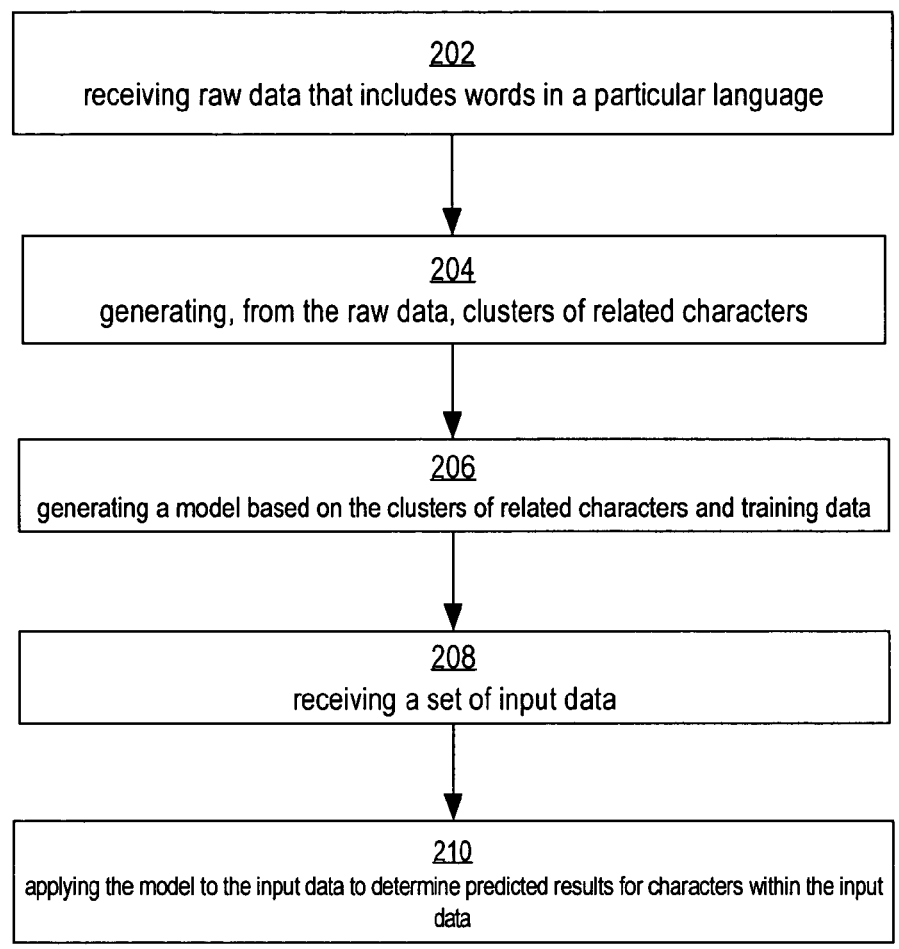
FIG. 2 is a process of generating a model based on clusters of related characters, and applying the model to determine predicted results, in accordance with an embodiment of the present invention.

FIG. 2 is a process 200 of generating a model based on clusters of related characters, and applying the model 132 to determine predicted results 160, in accordance with an embodiment of the present invention. Process 200 will be discussed in connection with the architecture of FIG. 1. However, process 200 is not so limited.

Step 202 is receiving raw data 120 that includes words in a particular language. As previously discussed, the raw data 120 may be un-segmented. As an example, the raw data 120 comprises characters from the Chinese language.

Step 204 is generating, from the raw data 120, clusters of related characters. As an example, a particular character cluster 140 contains different characters that are somehow related, based on an analysis of the raw data 120.

Step 206 is generating a model 132 based on the clusters of related characters and training data 115. Generating the model 132 comprises applying features to characters in the training data 115 based on the clusters of related characters. For example, a particular character in the training data 115 is assigned a feature that identifies a particular character cluster 140. More particularly, the assignment may be based on a determination that the particular character is a member of the particular character cluster 140.

The characters in the training data may also be assigned features based on segment clusters 145. The following describes one technique for this. The training data 115 is examined for segments that match a segment in one or more of the segment clusters 145. When a segment match is found, one or more of the characters of the segment in the training data 115 is assigned a feature that identifies the segment cluster or clusters 145 having the segment. In one embodiment, the first character in the segment in the training data 115 is assigned the feature. However, more generally, any of the characters in the segment in the training data may be assigned a feature based on the segment cluster 145 with the matching segment.

The characters in the training data may be assigned many other types of features, some of which may be based on the designated results. For example, a character may be assigned a feature based on its designated result of being the beginning of a word. As another example, a character may be assigned a feature based on its designated result of being associated with a named entity. Many other types of features can be assigned to the characters.

Step 208 is receiving a set of input data 150. The input data 150 may be un-segmented data. For example, the input data 150 may be text of a language for which words are not explicitly demarcated, such as Chinese.

Step 210 is applying the model 132 to the input data 150 to determine predicted results 160 for characters within the input data 150. Applying the model 132 comprises applying features to characters in the input data 150 based on the clusters of related characters. The features that are applied are typically the same features that were applied to the characters of the training data 115. One of the features applied to a character in the input data identifies a particular character cluster 140. For example, if the character is determined to be a member of a particular character cluster 140, a feature is applied to the character identifying that character cluster 140.

Another feature applied to a character in the input data 150 identifies a particular segment cluster 145. Applying a feature to a character in the input data 150 that identifies a particular segment cluster 145 can be performed similar to the technique described above for applying a feature to a character in the input data 150 that identifies a particular character cluster 140.

Applying features based on character clusters 140 and/or segment clusters 145 can improve the accuracy of the prediction in that the MLT 110 has more information on which to base a predicted result.

After the features are applied to the characters of the input data 150, the MLT 110 predicts results based, at least upon, the features. As an example, the MLT 110 predicts word segment boundary in the input data 150. More particularly, the MLT 110 may determine which characters begin words and which do not begin words, based on the features assigned to the characters. As another example, the MLT 110 predicts named entities in the input data 150. More particularly, the MLT 110 may determine that a group of one or more characters are associated with a named entity, based on the features assigned to the characters. Because a named entity may comprise multiple characters, the MLT 110 may examine several characters to predict a named entity. For example, the MLT 110 might predict that a first character is the beginning of a named entity and that two characters that follow the first character are a part of the named entity other than the beginning.

Example Process

Figure 3:
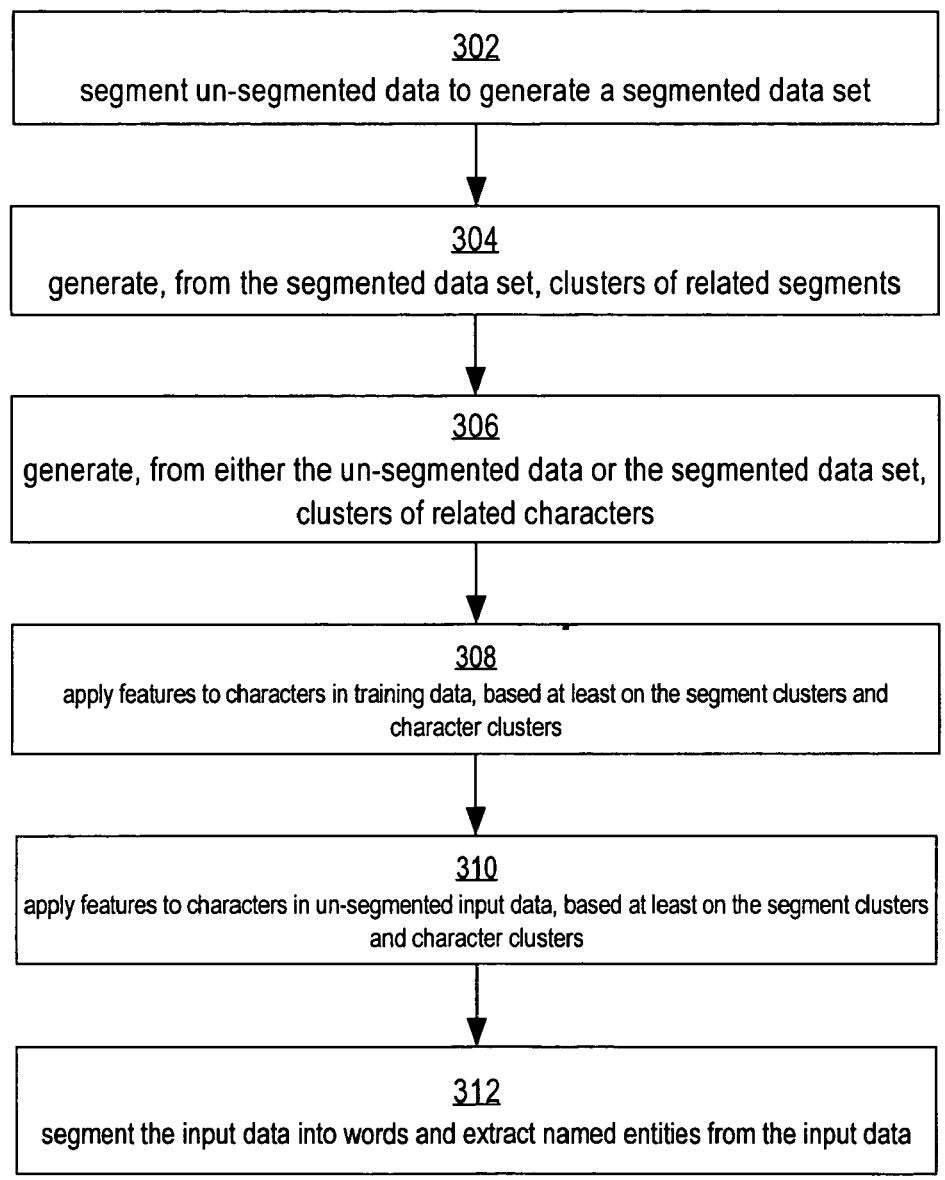
FIG. 3 is a process of using segment clusters and character clusters in determining word segments and extracting named entities, in accordance with an embodiment of the present invention.

FIG. 3 is a process 300 of using segment clusters and character clusters in determining word segments and extracting named entities in some input data 150, in accordance with an embodiment of the present invention. Process 300 will be discussed in connection with the architecture of FIG. 1. However, process 300 is not so limited. Step 302 is segmenting raw data 120 set to generate a segmented data 128 set. A segment comprises one or more characters. A particular segment in the segmented data 128 may or may not correspond to a word.

Step 304 is generating, from the segmented data 128, clusters of related segments. The related segments may or may not correspond to words. One technique for generating segment clusters 145 is distributional word clustering; however other techniques may be used.

Step 306 is generating, from either the raw data 120 or the segmented data 128, clusters of related characters. One technique for generating character clusters 140 is distributional word clustering; however other techniques may be used. When generating character clusters 140 using distributional word clustering, a character may be treated as a word.

Step 308 is applying features to characters in training data 115, based at least on the segment clusters 145 and character clusters 140. Step 308 may comprise a similar technique to the one discussed in step 206 of process 200. Process 300 is not limited to applying features only to characters.

Step 310 is applying features to characters in the input data 150, based at least on the segment clusters 145 and character clusters 140. For the sake of illustration, the input data 150 is assumed to be un-segmented. Therefore, features are applied to the characters of the input data 150, in this embodiment. However, as discussed below it is possible to assign features to segments.

Step 312 is segmenting the input data 150 into words and extracting named entities from the input data 150. Step 312 is based on the features that were applied to the characters. The MLT 100 determines a predicted result for a character, based on the features. To segment the input data 150, the MLT 110 predicts whether or not each character is the beginning of a word. To extract named entities, the MLT 110 predicts which characters are associated with named entities and analyzes the prediction to adjacent characters.

Assigning Features to Segments

Process 200 and Process 300 describe embodiments in which features are applied to characters in the training data 115 and the input data 150. Features may also be applied to segments in the training data 115 and the input data 150. As previously discussed, the training data 115 may contain information that indicates which characters form words. Thus, features can be applied to words in the training data 115. More generally, features can be applied to segments in the training data 115 that may or may not correspond to words.

In one embodiment, a particular segment in the training data 115 is assigned a feature that identifies a particular segment cluster 145. More particularly, the assignment may be based on a determination that the particular segment in the training data 115 is a member of the particular segment cluster 145. The particular segment may be a word if the training data 115 is segmented into words. However, the segment does not have to correspond to a word in any language.

Furthermore, features may be applied to segments of the input data 150. The input data 150 may have been segmented by applying process 300 to segment the input data 150. Alternatively, the input data 150 may have been segmented by any other technique. The input may be inherently segmented, such as word of English text. In one embodiment, features are assigned to segments in the input data based on a determination that a particular segment in the input data is a member of a particular segment cluster 145. Thus, predicting results for the input data 150 may be based on features that are applied to segments and/or characters in the input data.

Hardware Overview

Figure 4:
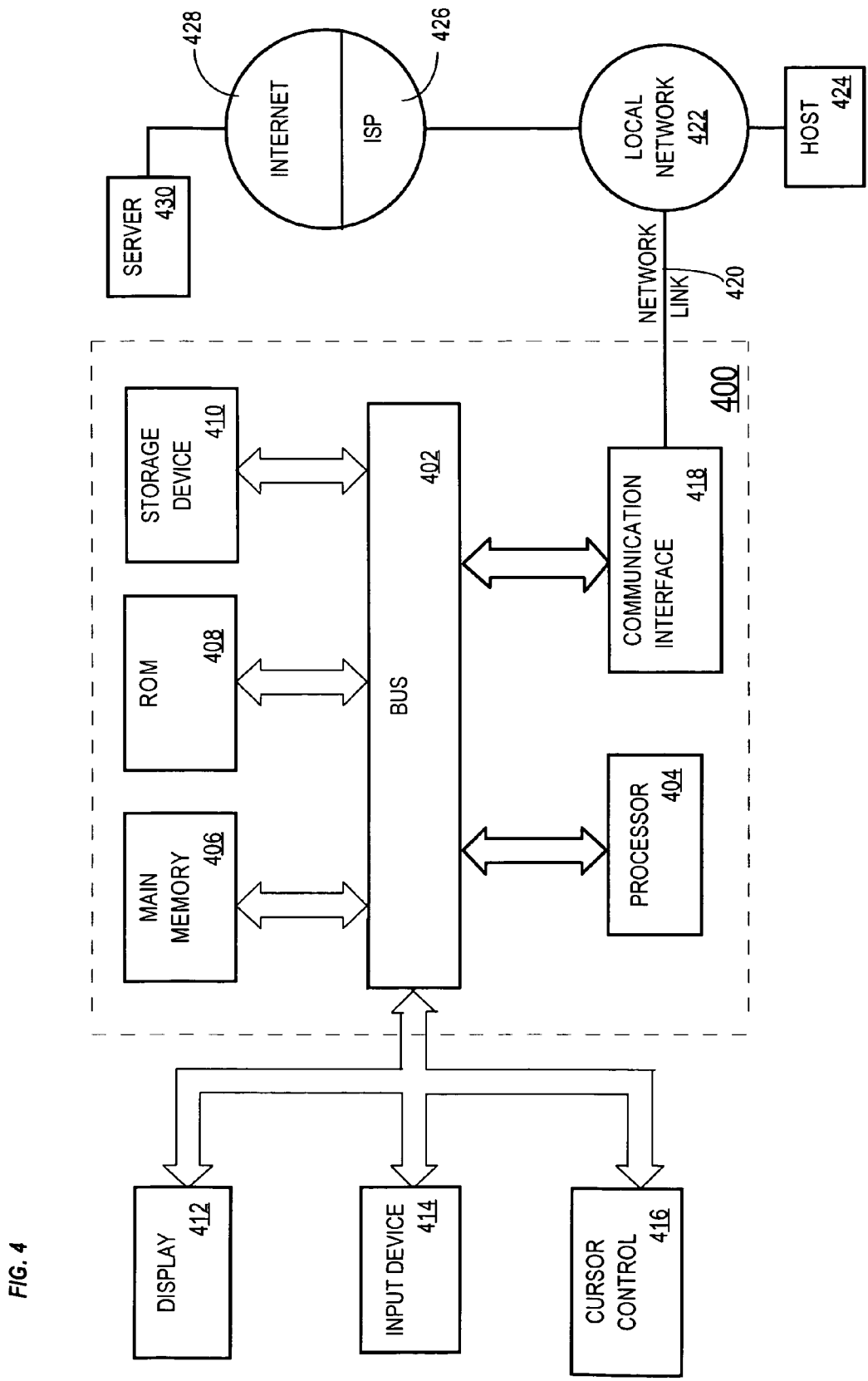
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method comprising the steps of:
creating a model by:
receiving a data set that includes a plurality of words in a particular language,
wherein in the particular language, words are formed by characters;
wherein the plurality of words include items for which designated results have not been previously established;
wherein an item is either a single character or a segment that comprises a plurality of characters;
determining which items are related based on an analysis of the data set;
based on the determining which items are related, generating, from items in the data set, clusters of related items;
a computer system generating the model based at least on both:
the clusters of related items; and
training data that includes a plurality of entries, wherein each entry includes an entry item and a designated result for said entry item;
wherein the step of generating the model comprises applying features to items in the training data based on the clusters of related items;
after generating the model, performing the steps of:
receiving a set of input data, wherein the input data includes items that have not been associated with designated results; and
applying the model to the input data to determine predicted results for items within the input data.

2. The method of claim 1, wherein the step of applying features to items in the training data comprises:
for at least a particular item in the training data, determining one or more clusters of related items with which the particular item matches; and
assigning, to the particular item in the training data, a feature that identifies the one or more clusters of related items.

3. The method of claim 2, wherein the particular item is a member of at least a particular cluster of the one or more clusters.

4. The method of claim 1, wherein the step of applying the model comprises applying features to items in the input data based on the clusters of related items.

5. The method of claim 4, wherein the step of applying the model to the input data comprises determining predicted results based, at least, upon the features applied to the items in the input data.

6. The method of claim 4, wherein the step of applying features to items in the input data comprises assigning, to a particular item in the input data, a feature that identifies a particular cluster of related items.

7. The method of claim 6, wherein the particular item in the input data is a member of the particular cluster.

8. The method of claim 1, wherein the step of generating clusters of related items comprises associating a particular item to more than one of the clusters.

9. The method of claim 1, wherein the step of generating clusters of related items comprises generating a one-to-one mapping between particular items and particular clusters.

10. The method of claim 1, wherein the step of generating clusters of related items from the data set comprises using distributional word clustering.

11. The method of claim 1, wherein the step of applying the model comprises assigning a feature associated with a particular cluster of the clusters of related items to an item in the input data.

12. The method of claim 1 wherein at least one of the predicted results is that a character in the input data set is a word boundary.

13. The method of claim 1 wherein at least one of the predicted results is that an item in the input data set is associated with a named entity.

14. The method of claim 1 wherein the particular language is a language that does not include indications of boundaries between words of the language.

15. The method of claim 1 wherein at least one item in the input data is a single character.

16. The method of claim 1 wherein at least one item in the input data is a segment that comprises a plurality of characters, further comprising:
prior to the step of generating clusters of related items from the data set, segmenting the data set into segments.

17. One or more non-transitory computer readable storage media storing instructions which, when executed by one or more computing devices, cause performance of the method recited in claim 1.

18. One or more non-transitory computer readable storage media storing instructions which, when executed by one or more computing devices, cause performance of the method recited in claim 2.

19. One or more non-transitory computer readable storage media storing instructions which, when executed by one or more computing devices, cause performance of the method recited in claim 3.

20. One or more non-transitory computer readable storage media storing instructions which, when executed by one or more computing devices, cause performance of the method recited in claim 4.

21. One or more non-transitory computer readable storage media storing instructions which, when executed by one or more computing devices, cause performance of the method recited in claim 5.

22. One or more non-transitory computer readable storage media storing instructions which, when executed by one or more computing devices, cause performance of the method recited in claim 6.

23. One or more non-transitory computer readable storage media storing instructions which, when executed by one or more computing devices, cause performance of the method recited in claim 7.

24. One or more non-transitory computer readable storage media storing instructions which, when executed by one or more computing devices, cause performance of the method recited in claim 8.

25. One or more non-transitory computer readable storage media storing instructions which, when executed by one or more computing devices, cause performance of the method recited in claim 9.

26. One or more non-transitory computer readable storage media storing instructions which, when executed by one or more computing devices, cause performance of the method recited in claim 10.

27. One or more non-transitory computer readable storage media storing instructions which, when executed by one or more computing devices, cause performance of the method recited in claim 11.

28. One or more non-transitory computer readable storage media storing instructions which, when executed by one or more computing devices, cause performance of the method recited in claim 12.

29. One or more non-transitory computer readable storage media storing instructions which, when executed by one or more computing devices, cause performance of the method recited in claim 13.

30. One or more non-transitory computer readable storage media storing instructions which, when executed by one or more computing devices, cause performance of the method recited in claim 14.

31. One or more non-transitory computer readable storage media storing instructions which, when executed by one or more computing devices, cause performance of the method recited in claim 15.

32. One or more non-transitory computer readable storage media storing instructions which, when executed by one or more computing devices, cause performance of the method recited in claim 16.

* * * * *